(12) United States Patent
Asano

(10) Patent No.: US 8,086,404 B2
(45) Date of Patent: Dec. 27, 2011

(54) ON-VEHICLE NAVIGATION SYSTEM

(75) Inventor: Michinao Asano, Fukushima (JP)

(73) Assignee: Alpine Electronics, Inc., Tokyo (JP)

(*) Notice: Subject to any disclaimer, the term of this patent is extended or adjusted under 35 U.S.C. 154(b) by 391 days.

(21) Appl. No.: 12/048,853

(22) Filed: Mar. 14, 2008

(65) Prior Publication Data
US 2008/0288163 A1 Nov. 20, 2008

(30) Foreign Application Priority Data
May 18, 2007 (JP) .................. 2007-132672

(51) Int. Cl.
*G01C 21/30* (2006.01)
*G08G 1/123* (2006.01)
(52) U.S. Cl. ............... 701/211; 340/995.19; 340/995.2
(58) Field of Classification Search ............... 701/118, 701/201, 202, 204, 208, 46; 244/1 R; 342/357.09; 382/104; 705/8, 1.66; 105/355; 348/159; 340/928
See application file for complete search history.

(56) References Cited

U.S. PATENT DOCUMENTS

| | | | |
|---|---|---|---|
| 6,111,521 A * | 8/2000 | Mulder et al. ........... 340/905 |
| 6,804,604 B2 | 10/2004 | Yamazaki | |
| 7,433,780 B2 | 10/2008 | Machino | |
| 8,024,115 B2 | 9/2011 | Hayashida et al. | |
| 2001/0021895 A1* | 9/2001 | Yamazaki ........... 701/211 |
| 2007/0050134 A1* | 3/2007 | Hayashida et al. ....... 701/209 |

FOREIGN PATENT DOCUMENTS

| | | |
|---|---|---|
| JP | 2000-018956 | 1/2000 |
| JP | 2001-183159 | 7/2001 |
| JP | 2001-183159 A | 7/2001 |
| JP | 2005-037270 | 2/2005 |
| JP | 2005-037329 | 2/2005 |
| JP | 2005-083758 | 3/2005 |
| JP | 2006-053109 | 2/2006 |
| JP | 2006-138798 A | 6/2006 |
| JP | 2007-086052 | 4/2007 |

* cited by examiner

Primary Examiner — James Trammell
Assistant Examiner — Muhammad Shafi
(74) Attorney, Agent, or Firm — Brinks Hofer Gilson & Lione (57) ABSTRACT

The present invention provides an on-vehicle navigation system in which a user can perform predetermined driving using a special lane such as a carpool lane appropriately and without anxiety where advancing from a normal lane in a predetermined advancing authorized section and exiting to the normal lane in a predetermined exiting authorized section are authorized. The system includes a remaining number notifying section for notifying the user of the remaining number of at least one of an exiting authorized section for exiting from a special lane to the normal lane and an advancing authorized section for advancing to the special lane from a normal lane, between a vehicle position detected by a vehicle position calculation section and an interchange point or an exit of a plural-lane road including the special lane and the normal lane which exists on a recommended route, in performing route guidance of the vehicle.

20 Claims, 4 Drawing Sheets

ON-VEHICLE NAVIGATION SYSTEM

RELATED APPLICATION

The present application claims priority to Japanese Patent Application Number 2007-132672, filed May 18, 2007, the entirety of which is hereby incorporated by reference

BACKGROUND OF THE INVENTION

1. Field of the Invention

The present invention relates to an on-vehicle navigation system, and particularly relates to an on-vehicle navigation system for supporting driving by using a special lane such as a carpool lane or the like.

2. Description of the Invention

Conventionally, in an on-vehicle navigation system, after searching a recommended route from a current position to a destination by using a route calculation method such as Dijkstra's method, route guidance of a vehicle from the current position to the destination has been performed along the searched recommended route. In this type of on-vehicle navigation system, before searching a recommended route, search conditions for a recommended route, such as use of an expressway, can be previously set by user operation, and a user was able to receive route guidance along a recommended route satisfying the set search conditions.

Highways (or freeways) in large cities of the U.S. can include a special lane that is called a carpool lane together with a normal lane.

The carpool lane is a lane provided for removing a traffic jam, reducing exhaust gas, decreasing commuting time or the like; and public buses, cars and motorcycles with two or more passengers (specified number of passengers is different among states) can use the lane. Hybrid cars can also use the lane even in the case of one passenger when they apply to the motor vehicle official of a state government agency and permission is granted. However, if a vehicle that does not satisfy such restrictions enters the carpool lane, it is fined for a violation. Legal advancing from the normal lane to the carpool lane is authorized only from a predetermined advancing authorized section (in other words, entrance), and legal exiting to the normal lane is authorized only from a predetermined exiting authorized section (in other words, exit). Note that the exiting authorized section and the advancing authorized section are usually regarded as the same (in other words, a unified entrance/exit) in the carpool lane.

Some on-vehicle navigation systems capable of setting whether such a carpool lane should be used as a search condition of a recommended route have been suggested, such as Japanese Patent Laid-Open No. 2001-183159 and Japanese Patent Laid-Open No. 2006-138798. However, in order to confirm the exiting authorized section and the advancing authorized section of the carpool lane in actual driving, the user must depend on the difference in lane indications or the existence of small markings. This makes it difficult to actually confirm the exiting authorized section and advancing authorized section in many cases.

Thus, even if route guidance allowing the vehicle to exit from the carpool lane to the normal lane through the exiting authorized section along the recommended route was performed, the user may miss the exiting authorized section. If such a situation occurs near an interchange or an exit from the highway on the recommended route, the vehicle is prevented from moving toward the interchange point or the exit of highway, and thus the vehicle deviates considerably from the recommended route. Further, even in the case where the vehicle succeeds in exiting the carpool lane at the exiting authorized section, it may be difficult to move from the exiting authorized section to the interchange point or the highway exit because of the number or width of normal lanes.

Further, in the case where a search condition to preferentially drive in the carpool lane was set in a conventional on-vehicle navigation system, route guidance using the carpool lane as a recommended route was performed to the interchange point or the highway exit after the vehicle advanced to the highway, but there were cases where the vehicle missed the advancing authorized section because of the difficulty of confirming the advancing authorized section.

Such a difficulty of confirming the exiting authorized section and the advancing authorized section may give the user a sense of insecurity and interfere with safe driving. Therefore, there has been a problem that the user had difficulty in reliably performing desired driving using a special lane such as the carpool lane.

SUMMARY OF THE INVENTION

The present invention has been created in view of such problems, and it is an object of the invention to provide an on-vehicle navigation system with which a user can perform desired driving appropriately and without anxiety by using a special lane such as a carpool lane where advancing from a normal lane in a predetermined advancing authorized section and exiting to a normal lane in a predetermined exiting authorized section are authorized.

In order to achieve the above-described object, one embodiment of the on-vehicle navigation system according to the present invention is an on-vehicle navigation system that performs route guidance for a vehicle from a current position to a destination along a recommended route to the destination, which includes: a vehicle position calculation section for detecting a vehicle position; a recommended route searching section for searching the recommended route; and a remaining number notifying section for notifying a user of the remaining number of at least one of the exiting authorized section and the advancing authorized section between the vehicle position detected by the vehicle position calculation section and an interchange point or an exit of a plural-lane road which exists on the recommended route in performing route guidance for the vehicle, in the case where the recommended route searched by the recommended route searching section includes a normal lane and a special lane where advancing from the normal lane in a predetermined advancing authorized section and exiting to the normal lane in a predetermined exiting authorized section are authorized.

BRIEF DESCRIPTION OF THE DRAWINGS

4(b) is a guidance state and notification state of the remaining number at a second carpool lane entrance/exit.

PREFERRED EMBODIMENTS OF THE INVENTION

Embodiments of the on-vehicle navigation system according to the present invention will be described by referring to FIG. 1 to FIG. 5.

Figure 1:
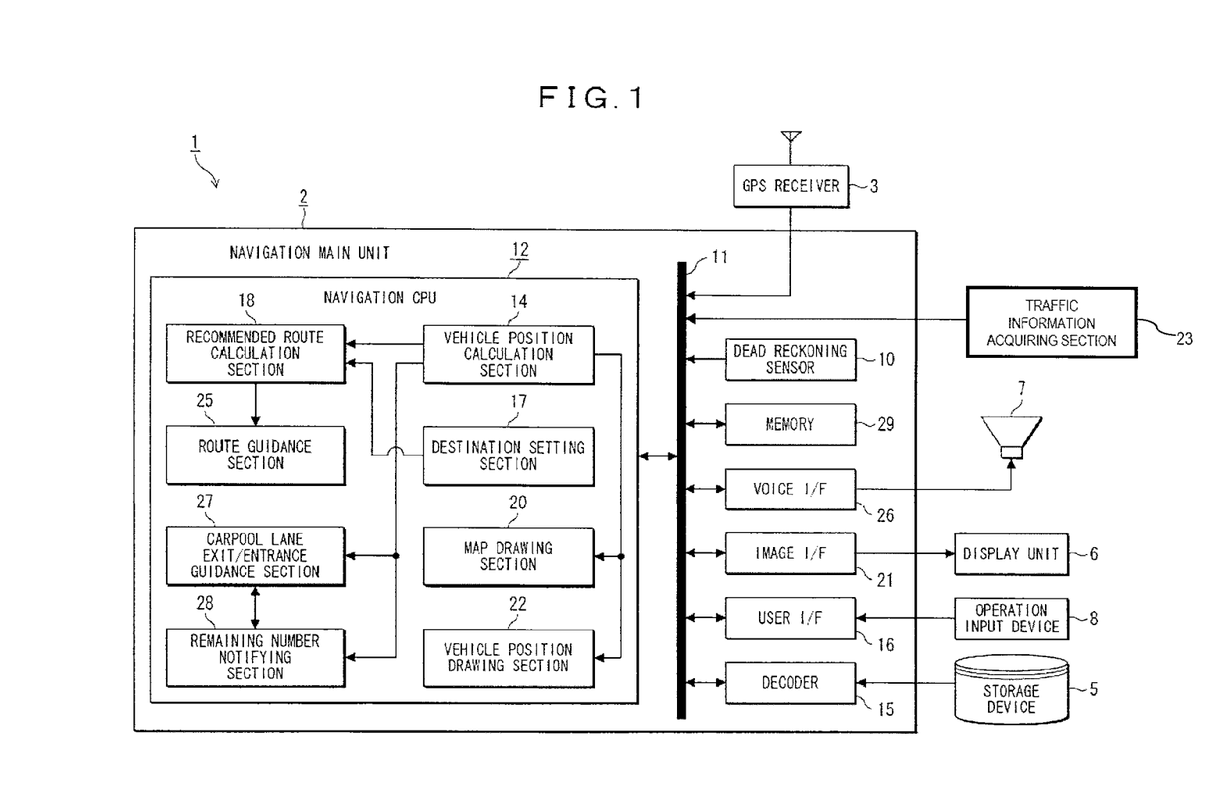
FIG. 1 is a block diagram of an embodiment of the on-vehicle navigation system according to the present invention.

As shown in FIG. 1, an on-vehicle navigation system 1 in this embodiment is constituted generally by a navigation main unit 2, a GPS receiver 3, a storage device 5, a display unit 6, a speaker 7, and an operation input device 8 with which a user inputs various instructions necessary for navigation to the navigation main unit 2, all of which are connected to the navigation main unit 2.

The navigation main unit 2 is designed to perform various controls and processes for navigation to provide a vehicle with route guidance along a recommended route from a current position to a destination.

The GPS receiver 3 is designed to receive information regarding orbit and time from a GPS satellite (not shown) (hereinafter referred to as GPS information) and provide the received GPS information to the navigation main unit 2.

Various data including map data and programs necessary for navigation are stored in the storage device 5. Note that the map data contains road data and background data that are used in route guidance or the like by displaying a map or images on the display unit 6, route calculation data used in calculating a recommended route, and retrieval data used in searching for a destination or peripheral facilities, or the like. Further, the storage device 5 may be a hard disc drive, a DVD drive on which a DVD is mounted, or the like.

The operation input device 8 may be a touch panel, a remote controller, a linear encoder or a rotary encoder of the display unit 6.

Describing the navigation main unit 2 in more detail, the navigation main unit 2 includes a dead reckoning sensor 10 that is made up of a gyro sensor, a vehicle speed sensor (vehicle speed pulse) and the like. The dead reckoning sensor 10 is designed to detect the angular velocity and the speed of the vehicle and output a detection result.

A navigation CPU 12 functions as a main control section and is connected to the dead reckoning sensor 10 through a system bus 11. The navigation CPU 12 includes a vehicle position calculation section 14 for calculating a vehicle position as a function block, and GPS information supplied from the GPS receiver 3 and a detection result supplied from the dead reckoning sensor 10 are provided to the vehicle position calculation section 14 through the system bus 11.

The vehicle position calculation section 14 is designed to calculate (detect) a vehicle position as an absolute coordinate from GPS information supplied from the GPS receiver 3 (radio navigation). Further, based on the detection result received from the dead reckoning sensor 10, the vehicle position calculation section 14 is designed to calculate (detect) a vehicle position as a relative change amount from the previous vehicle position (dead reckoning).

The storage device 5 is connected to the navigation CPU 12 through the system bus 11 and a decoder 15, and the vehicle position calculation section 14 is designed to read map data stored in the storage device 5 after it is decoded by the decoder 15. The vehicle position calculation section 14 is designed to perform a map matching process in which a calculated vehicle position is matched with a position on an appropriate road in the map data read from the storage device 5, and to set a vehicle position after the map matching process as a final calculation result.

A user interface 16 (user I/F in FIG. 1) is connected to the navigation CPU 12 through the system bus 11 and is designed to receive the operation result of the operation input device 8.

The navigation CPU 12 includes a destination setting section 17 as a function block, and an operation result for setting a destination is provided to the destination setting section 17 as an operation result of the operation input device 8 through the user interface 16. The destination setting section 17 is designed to set a point corresponding to the provided operation result as a destination. Retrieval data in the map data stored in the storage device 5 is used for the setting of a destination.

The navigation CPU 12 also includes a recommended route calculation section 18 for searching a recommended route, and information of the vehicle position calculated by the vehicle position calculation section 14 (a vehicle position calculated after the map matching process in the case where the map matching process has been appropriately performed) and information of the destination set by the destination setting section 17 are provided to the recommended route calculation section 18. The recommended route calculation section 18 is designed to perform route calculation for calculating (searching) a recommended route from the vehicle position to the destination based on the information of the vehicle position and destination. The recommended route calculation section 18 is designed to read route calculation data in the map data from the storage device 5 for route calculation.

Moreover, a calculation condition of the recommended route is provided to the recommended route calculation section 18 as an operation result of the operation input device 8. The calculation condition of the recommended route includes a calculation condition that a recommended route preferentially including a carpool lane is to be calculated, for example. Then, the recommended route calculation section 18 is designed to calculate a recommended route satisfying the calculation condition.

Further, the navigation CPU 12 includes a map drawing section 20 as a function block, and an instruction for displaying a map of an area specified by the user (an area around the vehicle position, for example) is provided to the map drawing section 20 as an operation result of the operation input device 8. Then, the map drawing section 20 is designed to generate a map of the area specified by the user in response to the operation result of the operation input device 8, output the generated map to the display unit 6 through the system bus 11 and an image interface 21 (image I/F in FIG. 1) connected between the system bus 11 and the display unit 6, and perform map display.

The navigation CPU 12 also includes a vehicle position drawing section 22 as a function block, and the vehicle position drawing section 22 is designed to overlap a vehicle position mark showing the current vehicle position on the map around the vehicle position displayed on the display unit 6.

Moreover, the navigation CPU 12 includes a route guidance section 25 as a function block, and the route guidance section 25 is designed to generate a guidance image for guiding the vehicle to the destination along the recommended route calculated by the recommended route calculation section 18, display the generated guidance image on the display unit 6, and perform route guidance via the image. Note that the guidance image contains various images such as the image of the recommended route overlapped on the map, an enlarged intersection image, and a message that prompts exiting or advancing from/to the carpool lane along the recommended route.

The route guidance section 25 may be designed to generate guidance voice for guiding the vehicle to the destination along the recommended route calculated by the recommended route calculation section 18, perform speech output of the generated guidance voice to the speaker 7 through the system bus 11 and a voice interface 26 (voice I/F in FIG. 1) connected between the system bus 1 and the speaker 7, and perform route guidance by voice output. Note that the guidance voice contains various voice instructions such as voice instructions for guiding intersection right/left turn guidance or voice instructions for prompting exiting or advancing from/to the carpool lane along a recommended route.

Here, the carpool lane is a special lane in the U.S. for promoting carpooling as described above, and the carpool lane can be part of a highway as a plural-lane road together with the normal lane. Similar to a general carpool lane, it is assumed that the carpool lane in this embodiment includes unified exits/entrances in which an advancing authorized section (entrance) where legal advancing from the normal lane is authorized and an exiting authorized section (exit) where legal exiting to the normal lane is authorized are the same (hereinafter, referred to as a carpool lane entrance/exit) with a predetermined distance between the carpool lane and a normal lane.

In this embodiment, the navigation CPU 12 includes a carpool lane entrance/exit guidance section 27 as a function block, and the carpool lane entrance/exit guidance section 27 is designed to function as an exiting authorized section guidance section and an advancing authorized section guidance section. When performing route guidance in the case where the recommended route calculated by the recommended route calculation section 18 includes a carpool lane, in the case where a distance between a vehicle position calculated by the vehicle position calculation section 14 and a carpool lane entrance/exit that exists in the moving direction of the vehicle (front) with respect to the vehicle position is a predetermined distance or less, the carpool lane entrance/exit guidance section 27 is designed to guide the user to the carpool lane entrance/exit by at least one of a display on the display unit 6 and speech output via the speaker 7.

In this embodiment, navigation CPU 12 includes a remaining number notifying section 28 as a function block, which is designed to notify the user of a remaining number. In the case where the recommended route calculated by the recommended route calculation section 18 includes a carpool lane, the remaining number notifying section 28 is designed to guide the remaining number of carpool lane entrances/exits between the vehicle position calculated by the vehicle position calculation section 14 and an interchange point or highway exit that exists on the recommended route (hereinafter referred to as a highway interchange point/exit on recommended route) to the user by at least one of a display on the display unit 6 and speech output via the speaker 7 when performing route guidance. The remaining number notifying section 28 is designed to perform notification of the remaining number of carpool lane entrances/exits synchronously with the guidance of the carpool lane entrance/exit by the carpool lane entrance/exit guidance section 27.

For example, a notification that the remaining number of carpool entrances/exits is plural allows the user to drive knowing that there is still enough time and distance left until exiting from the carpool lane to the normal lane along the recommended route in order to move to the highway interchange point/exit on the recommended route. In addition, the user can drive knowing that there is an opportunity to exit the carpool lane earlier than exiting from the carpool lane to the normal lane along the recommended route (i.e., another carpool lane entrance/exit that exists before the carpool lane entrance/exit on the recommended route). Alternatively, the user can drive knowing that there is still an opportunity to advance to the carpool lane before reaching the highway interchange point/exit on the recommended route, for example, even if he/she failed to advance to the carpool lane already. Therefore, the notification of the remaining number of carpool lane entrances/exits allows the user to perform desired driving using the carpool lane appropriately without anxiety or mental pressure.

Because the notification of the remaining number of carpool lane entrances/exits is performed synchronously with the guidance of carpool lane entrance/exit by the carpool lane entrance/exit guidance section 27 on a highway, a confusing needless frequent notification of the remaining number can be avoided. Further, control of the navigation CPU 12 can be simplified. Moreover, the guidance of carpool lane entrance/exit in combination together with the notification of the remaining number allows for easy determination of whether to exit or advance from/to the carpool lane, and safe driving with less uncertainty.

In addition to such a notification of the remaining number of carpool lane entrances/exits synchronous with the guidance of carpool lane entrance/exit by the carpool lane entrance/exit guidance section 27, means are provided for visually notifying the remaining number of carpool lane entrances/exits corresponding to the current vehicle position and the remaining number of carpool lane entrances/exits corresponding to a future vehicle position at the same time (on one screen). Specifically, the remaining number notifying section 28 is designed to overlap a figure showing the remaining number of carpool lane entrances/exits corresponding to the current vehicle position on a position corresponding to the closest carpool lane entrance/exit in the travel direction of the vehicle on the map of an area where the vehicle is currently driving displayed on the display unit 6 together with the vehicle position mark.

Further, the remaining number notifying section 28 is designed to overlap a figure obtained by subtracting one from the preceding figure on a position corresponding to the n-th carpool lane entrance/exit counting toward the highway interchange point/exit on the recommended route using the closest carpool lane entrance/exit on the map as a starting point. It should be noted that n is a natural number and satisfies the condition of "$2 \leq n \leq a$, which is the total number of carpool lane entrances/exits between the current vehicle position to the highway interchange point/exit on the recommended route".

As described, the remaining number notifying section 28 can notify simultaneously the remaining number of carpool lane entrances/exits corresponding to the current vehicle position and the remaining number of carpool lane entrances/exits corresponding to a future vehicle position by displaying figures on the map. Accordingly, the user can learn in advance how many carpool lane entrances/exits remain forward at which point on the recommended route at a glance, and drive with much less mental pressure. Note that in view of preventing the user's confusion, it is preferable that the remaining number notifying section 28 omit displaying figures of the remaining numbers for carpool lane entrances/exits where the vehicle has already passed.

The carpool lane entrance/exit guidance section 27 may guide all carpool lane entrances/exits in a section from a drive start position of the vehicle on a highway (hereinafter referred to as a highway drive start position) to a highway interchange point/exit on the recommended route, but preferably, the guide section preferentially guides carpool lane entrances/exits that exist on the side of the highway interchange point/exit on the recommended route as an exiting authorized section. Herein, "preferentially" is not an order of guidance, but means priority where such entrances/exits are included in carpool lane entrances/exits that are guided as an exiting authorized section.

Note that the guidance of carpool lane entrances/exits as an exiting authorized section may be performed so as to allow the user to definitely perceive that the carpool lane entrance/exit is guided as an exiting authorized section by display or voice output indicating the carpool lane exit exists, for example.

Where a large number of carpool lane entrances/exits exist between the drive start position and a highway interchange point/exit on the recommended route, carpool lane entrances/exits that are less likely used as an exiting authorized section can be excluded from guidance, so that the user's confusion caused by needless guidance of carpool lane entrances/exits can be avoided. Further, a useful carpool lane entrance/exit near a highway interchange point/exit on the recommended route can be preferentially guided as an exiting authorized section, while emphasizing that a recommended route calculated by a calculation condition that he/she preferentially drives in the carpool lane usually transits from the carpool lane to the normal lane through the carpool lane entrance/exit closest to the highway interchange point/exit on the recommended route.

However, such a preferential guidance of carpool lane entrances/exits near the highway interchange point/exit on the recommended route is made as guidance for an exiting authorized section, and does not hinder guidance of carpool lane entrances/exits as an advancing authorized section near the start of driving on the highway. When a plurality of carpool lane entrances/exits near the highway drive start position are guided as an advancing authorized section, another opportunity can be immediately provided even if the user has failed to advance to the carpool lane once, which is advantageous in view of advancing to the carpool lane. Even in the case of performing such a guidance of carpool lane entrances/exits near the highway drive start position, when guidance allows the user to definitely perceive that the carpool lane entrance/exit is being guided as an advancing authorized section, by display or speech output indicating that a carpool lane entrance exists, for example, needless guidance of an exiting authorized section will not be performed near the highway drive start position.

In a more preferable embodiment, in addition to the above-described configuration, a traffic information acquiring section 23 such as a beacon receiver that acquires traffic information near the highway interchange point/exit on the recommended route is further provided. Then, in response to an increase in traffic congestion near the highway interchange point/exit on the recommended route as shown by traffic information acquired by the traffic information acquiring section 23, the carpool lane entrance/exit guidance section 27 shifts the carpool lane entrance/exit guidance from the carpool lane entrance/exit closest to the highway interchange point/exit on the recommended route to the carpool lane entrance/exit closer to the highway drive start position. Further, notification of the remaining number of carpool lane entrances/exits as the exiting authorized section by the remaining number notifying section 28 is performed synchronously with guidance of carpool lane entrances/exits as an exiting authorized section by such a carpool lane entrance/exit guidance section 27. Note that a value showing how long (km) the line of traffic is formed near the highway interchange point/exit on the recommended route can be used as an indication of the traffic congestion, for example.

Consequently, in response to an increase in traffic congestion near the highway interchange point/exit on the recommended route, the carpool lane entrance/exit as an exiting authorized section for starting guidance can be shifted toward the highway drive start position, and a position of starting the notification of the remaining number of carpool lane entrances/exits as an exiting authorized section can also be shifted toward the highway drive start position. For example, in the case where the traffic congestion is less than a threshold value, guidance may start from the third carpool lane entrance/exit counting from the highway interchange point/exit on the recommended route to set the maximum value (initial value) of the remaining number of carpool lane entrances/exits to be notified to "3". On the other hand, in the case where the traffic congestion is a threshold value or larger, guidance may start from the fourth carpool lane entrance/exit counting from the highway interchange point/exit on the recommended route to set the maximum value of the remaining number to be notified to "4". Thus, the greater the traffic congestion near the highway interchange point/exit on the recommended route, the earlier the user can perceive an opportunity of exiting from the carpool lane, so that the user can perform the desired driving using the carpool lane in comfort.

In a more preferable embodiment, in addition to the above-described configuration, the navigation CPU 12 is provided as a lane quantity information acquiring section to acquire lane quantity information showing the number of normal lanes of the highway by using map data. Then, in response to an increase of lane quantity acquired by the navigation CPU 12, the carpool lane entrance/exit guidance section 27 shifts the carpool lane entrance/exit as an exiting authorized section for starting guidance from the carpool lane entrance/exit that exists closest to the highway interchange point/exit on the recommended route to a carpool lane entrance/exit closer to the highway drive start position. Further, synchronously with guidance of each carpool lane entrance/exit by such a carpool lane entrance/exit guidance section 27, the notification of the remaining number of carpool lane entrances/exits by the remaining number notifying section 28 is performed.

Consequently, in response to an increase of normal lane quantity, a carpool lane entrance/exit for starting guidance can be changed toward the highway drive start position and a position where the notification of the remaining number of carpool lane entrances/exits starts can be shifted toward the highway drive start position. For example, in the case where the normal lane quantity is less than three, guidance may start from the third carpool lane entrance/exit counting from the highway interchange point/exit on the recommended route to set the maximum value (initial value) of the remaining number of carpool lane entrances/exits to be notified to "3". On the other hand, in the case where the number of lanes is three or more, guidance may start from the fourth carpool lane entrance/exit counting from the highway interchange point/ exit on the recommended route, and the maximum value of the remaining number to be notified can be set to "4". Thus, the larger the number of normal lanes, the earlier the user can perceive an opportunity of exiting from the carpool lane, so that the user can perform desired driving using the carpool lane in comfort.

In a more preferable embodiment, in addition to the above-described configuration, the navigation CPU 12 is provided as a width information acquiring section to acquire width information showing the width of a normal lane of the highway by using map data. Then, in response to an increase of width as shown by width information acquired by navigation CPU 12, the carpool lane entrance/exit guidance section 27 shifts the carpool lane entrance/exit as an exiting authorized section for starting guidance from a carpool lane entrance/exit closest to the highway interchange point/exit on the recommended route to a carpool lane entrance/exit that exists closer to the highway drive start position. Further, the notification of the remaining number of carpool lane entrances/exits by the remaining number notifying section 28 is performed synchronously with guidance of each carpool lane entrance/exit by such a carpool lane entrance/exit guidance section 27.

Consequently, in response to an increase of the width of a normal lane, a carpool lane entrance/exit for starting guidance can be shifted toward the highway drive start position, and a position where the notification of the remaining number of carpool lane entrances/exits starts can be shifted toward the highway drive start position. For example, in the case where the width of a normal lane is less than a threshold value, guidance may start from the third carpool lane entrance/exit counting from the highway interchange point/exit on the recommended route to set the maximum value (initial value) of the remaining number of carpool lane entrances/exits to be notified to three. On the other hand, in the case where the normal lane width is a threshold value or larger, guidance may start from the fourth carpool lane entrance/exit counting from the highway interchange point/exit the on recommended route, and the maximum value of the remaining number to be notified can be set to four. Thus, the wider the width of a normal lane, the earlier the user can perceive an opportunity of exiting from the carpool lane, so that the user can perform desired driving using the carpool lane with comfort.

In a more preferable embodiment, in addition to the above-described configuration, in the case where the vehicle position calculation section 14 can calculate the vehicle position according to the type of lane on a highway and in the case where the calculated vehicle position exists on the normal lane, the carpool lane entrance/exit guidance section 27 performs guidance for the advancing authorized section of the carpool lane entrance/exit but avoids performing guidance for the exiting authorized section. Specifically, the carpool lane entrance/exit guidance section 27 performs display or speech output for only indicating that an entrance to the carpool lane exists. Further, with this guidance, in the case where the vehicle position calculated by the vehicle position calculation section 14 exists on the normal lane, the remaining number notifying section 28 performs notification of the remaining number of the carpool lane entrances/exits as an advancing authorized section but avoids performing notification of the remaining number as an exiting authorized section. Specifically, the remaining number notifying section 28 performs display or speech output of the remaining number of only the entrances to the carpool lane.

Guidance and notification of the remaining number of carpool lane entrances/exits corresponding to the current driving lane (advancing authorized section) can be thus performed.

As a case where the vehicle position can be calculated according to the type of lane in this manner, there may be a case where high detection accuracy of the GPS receiver 3 and the dead reckoning sensor 10 enables clear matching on a lane in a highway.

In the case where the vehicle position calculated by the vehicle position calculation section 14 exists on the carpool lane, the carpool lane entrance/exit guidance section 27 performs guidance of the carpool lane entrance/exit as an exiting authorized section but avoids performing guidance as an advancing authorized section. Specifically, the carpool lane entrance/exit guidance section 27 performs display or speech output for only indicating that a carpool lane exit exists. Further, with this guidance, in the case where the vehicle position calculated by the vehicle position calculation section 14 is on the carpool lane, the remaining number notifying section 28 performs notification of the remaining number of the carpool lane entrance/exits as an exiting authorized section but avoids performing notification of the remaining number as an advancing authorized section. Specifically, the remaining number notifying section 28 performs display or speech output of the remaining number of only the exits from the carpool lane.

Guidance of a carpool lane entrance/exit corresponding to the current driving lane (exiting authorized section) and notification of the remaining number can be thus performed.

In a more preferable embodiment, the carpool lane entrance/exit guidance section 27 performs guidance regarding the first carpool lane entrance/exit counting from the highway interchange point/exit on the recommended route side toward the highway drive start position as an exiting authorized section but avoids performing guidance as an advancing authorized section. With this guidance, although the remaining number notifying section 28 includes the first carpool lane entrance/exit counting from the highway interchange point/exit on the recommended route toward the highway drive start position in the remaining number to be notified as an exiting authorized section, it is excluded from the remaining number to be notified as an advancing authorized section.

Guidance as an advancing authorized section can be thus prevented regarding a carpool lane entrance/exit from which a vehicle cannot exit before the highway interchange point/exit on the recommended route if he/she advances into it, and it can be excluded from the remaining number as an advancing authorized section, so that the user can perform desired driving using the special lane more appropriately.

Returning to FIG. 1, a memory 29 is connected to the system bus 11, and is designed to be appropriately used for temporarily storing data communicating in the navigation main unit 2 or programs.

The operation of this embodiment will now be described.

Figure 2:
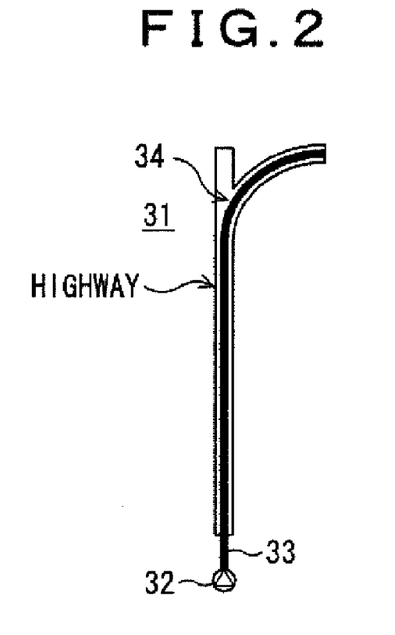
FIG. 2 is a view showing a map display state in the case where a vehicle is driving before a highway drive start position in the embodiment of the on-vehicle navigation system according to the present invention.

For convenience, it is assumed as an initial state that a recommended route including the carpool lane of a highway is to be calculated by the recommended route calculation section 18, and the vehicle travels while receiving route guidance by the route guidance section 25 to reach a point before the highway drive start position. At this point, the display unit 6 displays the map 31 showing an area around the current vehicle position by the map drawing section 20 and the vehicle position drawing section 22 together with the vehicle position mark 32 as shown in FIG. 2. Further, an image 33 of the recommended route that is in the moving direction of the vehicle overlaps with the vehicle position mark 32 on the map 31. The image 33 of the recommended route shows that the route deviates from the main line of the highway at the highway interchange point/exit on the recommended route.

In FIG. 2, although the image 33 of the recommended route is not finely defined enough to identify on which lane of the highway the vehicle travels, it will be understood that the image 33 of the recommended route may be modified to identify a lane on which the vehicle travels when a map having a larger scale than FIG. 2 is displayed. Note that higher vehicle position detection accuracy will be required in such a case.

Figure 3:
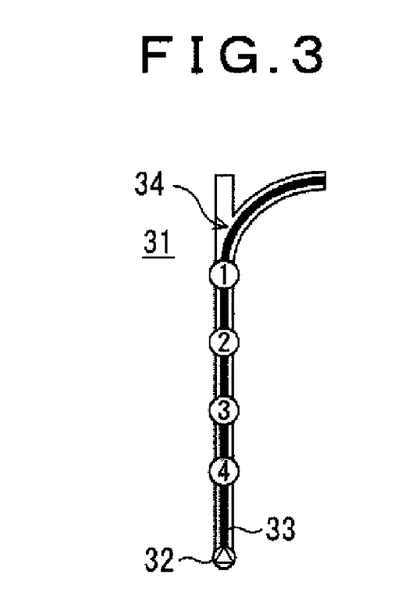
FIG. 3 is a view showing a simultaneous notification state of the remaining number of carpool lane entrances/exits corresponding to the current vehicle position in the highway drive start position and the remaining number of carpool lane entrances/exits corresponding to a future vehicle position in the embodiment of the on-vehicle navigation system according to the present invention.

When the vehicle reaches a position on the normal lane which is the highway drive start position after moving along the recommended route from the initial state, as shown in FIG. 3, the remaining number notifying section 28 overlaps figures showing the remaining number of carpool lane entrances/exits corresponding to the current vehicle position at a position corresponding to the carpool lane entrance/exit closest to the current vehicle position on the map 31 in the moving direction of the vehicle. Meanwhile, in FIG. 3, since the total number of carpool lane entrances/exits that exist between the current vehicle position (specifically, the highway drive start position) and the highway interchange point/exit on the recommended route is four, the figure "4" is displayed as the remaining number of carpool lane entrances/exits corresponding to the current vehicle position.

The closest carpool lane entrance/exit on the map 31 (hereinafter, referred to as a first carpool lane entrance/exit) is used as a starting point of reckoning, and the figure "3" obtained by subtracting 1 from 4 that is overlapped at a position corresponding to the first carpool lane entrance/exit is displayed at a position corresponding to the second carpool lane entrance/exit counting toward the highway interchange point/exit on the recommended route (hereinafter referred to as a second carpool lane entrance/exit) by the remaining number notifying section 28.

Similarly, the first carpool lane entrance/exit on the map 31 is used as a starting point of reckoning, and the figure "2" obtained by subtracting 2 from 4 displayed at the position corresponding to the first carpool lane entrance/exit is overlapped at a position corresponding to the third carpool lane entrance/exit counting toward the highway interchange point/exit on the recommended route (hereinafter referred to as a third carpool lane entrance/exit) by the remaining number notifying section 28. The figure "1" obtained by subtracting the 3 from 4 displayed at the position corresponding to the first carpool lane entrance/exit is overlapped at a position corresponding to the fourth carpool lane entrance/exit counting toward the highway interchange point/exit on the recommended route (hereinafter referred to as a fourth carpool lane entrance/exit) by the remaining number notifying section 28.

Thus, display of the remaining number of carpool lane entrances/exits corresponding to the current vehicle position and the remaining number of carpool lane entrances/exits corresponding to a future vehicle position are simultaneously performed by displaying figures on the map 31.

Figure 4A:
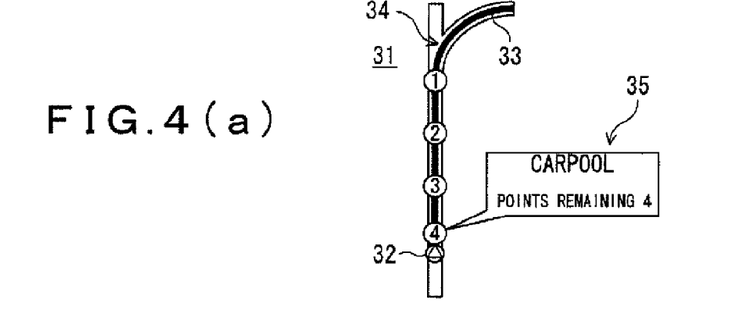
FIG. 4(a) is a guidance state and notification state of the remaining number at a first carpool lane entrance/exit; FIG.

In the case where the vehicle travels on the normal lane along the recommended route and a separated distance between the vehicle position calculated by the vehicle position calculation section 14 and the first carpool lane entrance/exit becomes a predetermined value or less, the display unit 6 displays a first guidance/remaining number notification image 35 by the carpool lane entrance/exit guidance section 27 and the remaining number notifying section 28 as shown in FIG. 4(a). It is assumed that the first guidance/remaining number notification image 35 is an image for performing guidance of the first carpool lane entrance/exit corresponding to the current vehicle position and for notifying the remaining number of carpool lane entrances/exits corresponding to the current vehicle position, which is synchronized with the guidance. Specifically, guidance of the first carpool lane entrance/exit is performed by the character display of "CARPOOL", and notification that the remaining number is "4" is performed by the character display of "Points Remaining 4". Note that the carpool lane entrance/exit guidance section 27 and the remaining number notifying section 28 may perform guidance of the carpool lane entrance/exit and notification of the remaining number by voice output in addition to character display.

Further, the route guidance section 25 performs route guidance that prompts the user to advance from the normal lane to the carpool lane through the first carpool lane entrance/exit. The route guidance may be a display and voice guidance such as "Advance to the carpool lane".

At this point, since the remaining number of carpool lane entrances/exits is notified, he/she can perceive that there is still an opportunity for advancing to the carpool lane to return to the recommended route even if he/she missed the first carpool lane entrance/exit for advancing to the carpool lane, and thus can drive in comfort.

Figure 4B:
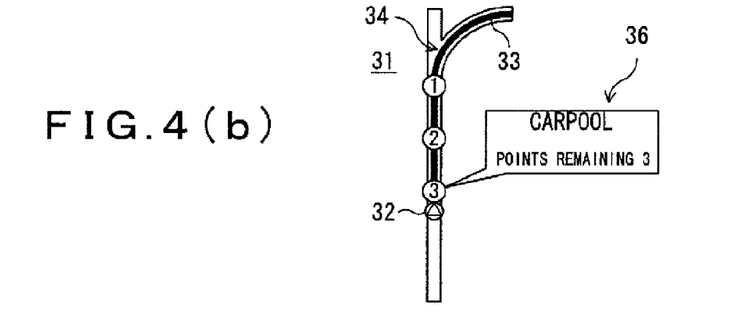

In the case where the vehicle travels in the carpool lane after advancing from the first carpool lane entrance/exit to the carpool lane along the recommended route and the distance between the vehicle position calculated by the vehicle position calculation section 14 and the second carpool lane entrance/exit is a predetermined distance or less, the display unit 6 displays a second guidance/remaining number notification image 36 generated by the carpool lane entrance/exit guidance section 27 and the remaining number notifying section 28 as shown in FIG. 4(b). It is assumed that the second guidance/remaining number notification image 36 is an image for performing guidance of the second carpool lane entrance/exit corresponding to the current vehicle position and notifying the remaining number of carpool lane entrances/exits corresponding to the current vehicle position, which is synchronized with the guidance. Specifically, the second guidance of carpool lane entrance/exit is performed by the character display of "CARPOOL", and a notification indicating the remaining number is three is performed by the character display of "Points Remaining 3".

At this point, the user may sometimes want to exit the carpool lane early due to a traffic jam near the highway interchange point/exit on the recommended route acquired by a VICS or the like, in order to securely move to the highway interchange point/exit on the recommended route. In such a case, the user can perceive that there is an opportunity for exiting the second carpool lane and the third carpool lane entrance/exit on the recommended route before the fourth carpool lane entrance/exit because of the guidance at the second carpool lane entrance/exit and the notification of the remaining number of carpool lane entrances/exits, so that he/she can drive in comfort.

Figure 4C:
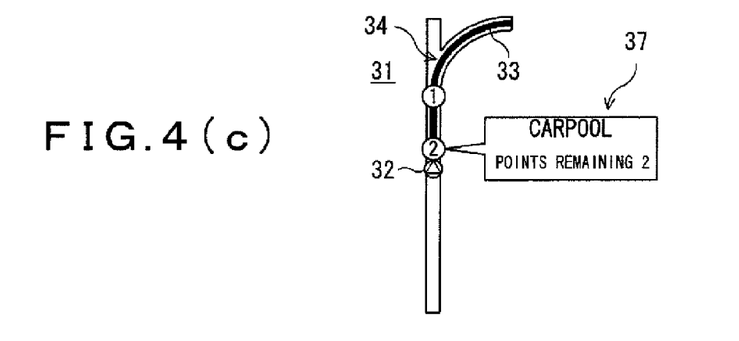
FIG. 4(c) is a guidance state and notification state of the remaining number at a third carpool lane entrance/exit.

When the distance between the vehicle position calculated by the vehicle position calculation section 14 and the third carpool lane entrance/exit becomes a predetermined distance or less after the vehicle passes the second carpool lane entrance/exit and travels further in the carpool lane, the carpool lane entrance/exit guidance section 27 and the remaining number notifying section 28 displays a third guidance/remaining number notification image 37 on the display unit 6 as shown in FIG. 4(c). It is assumed that the third guidance/remaining number notification image 37 is an image for performing guidance at the third carpool lane entrance/exit corresponding to the current vehicle position and notifying the remaining number of carpool lane entrances/exits corresponding to the current vehicle position, which is synchronized with the guidance. Specifically, guidance at the third carpool lane entrance/exit is performed by the character display of "CARPOOL", and notification that the remaining number is two is performed by the character display of "Points Remaining 2".

Figure 4D:
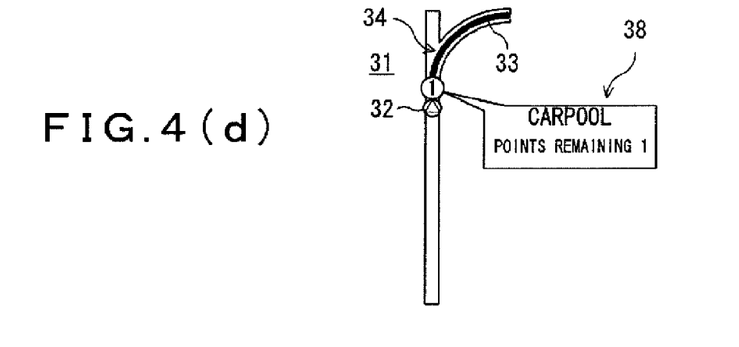
FIG. 4(d) is a guidance state and notification state of the remaining number at the last carpool lane entrance/exit, in the embodiment of the on-vehicle navigation system according to the present invention.

When the distance between the vehicle position calculated by the vehicle position calculation section 14 and the fourth carpool lane entrance/exit is a predetermined distance or less after the vehicle passes the third carpool lane entrance/exit and travels further in the carpool lane, the carpool lane entrance/exit guidance section 27 and the remaining number notifying section 28 displays a fourth guidance/remaining number notification image 38 on the display unit 6 as shown in FIG. 4(d). It is assumed that the fourth guidance/remaining number notification image 38 is an image for performing guidance of the fourth carpool lane entrance/exit corresponding to the current vehicle position and notifying the remaining number of carpool lane entrances/exits corresponding to the current vehicle position, which is synchronized with the guidance. Specifically, guidance at the fourth carpool lane entrance/exit is performed by the character display of "CARPOOL", and notification that the remaining number is one is performed by the character display of "Points Remaining 1".

At this point, the route guidance section 25 performs route guidance that prompts the user to exit from the carpool lane to the normal lane through the fourth carpool lane entrance/exit. The route guidance may be a display or voice guidance such as "Exit the carpool lane".

As described above, according to this embodiment, the remaining number notifying section 28 can notify the remaining number of carpool lane entrances/exits between the current vehicle position and the highway interchange point/exit on the recommended route, so that the user can perform desired driving using the carpool lane appropriately in comfort.

It should be noted that the present invention is not limited to the above-described embodiments but various modifications can be made as necessary.

For example, in displaying the figures of the remaining number of carpool lane entrances/exits, the remaining number notifying section 28 may simultaneously display a figure showing the remaining number of carpool lane entrance/exits as an exiting authorized section and displaying a figure showing the remaining number of carpool lane entrances/exits as an advancing authorized section when they can be discriminated distinctively.

In notifying the remaining number of carpool lane entrance/exits as an advancing authorized section, the carpool lane entrance/exit closest to the current vehicle position on the map is used as a starting point, and a number obtained by subtracting n−1 from the remaining number of carpool lane entrances/exits (n−1) corresponding to the current vehicle position is displayed on a position corresponding to the n-th carpool lane entrance/exit counting toward the highway interchange point/exit. Note that n in this case is a natural number that satisfies the condition that "$2 \leq n \leq$ a obtained by subtracting 1 from the sum of carpool lane entrances/exits between the current vehicle position and the highway interchange point/exit."

Figure 5:
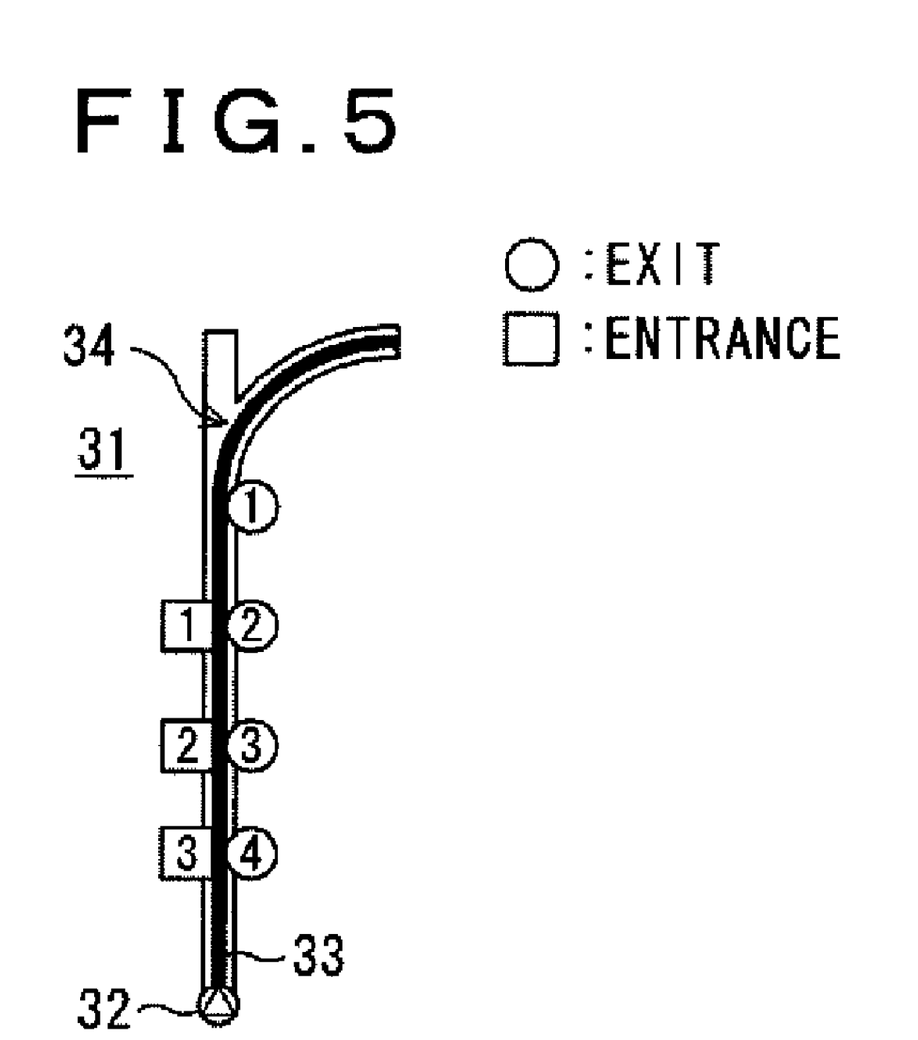
FIG. 5 is a view showing a modified example of the notification of the remaining number of carpool lane entrances/exits in the embodiment of the on-vehicle navigation system according to the present invention.

More specifically, as shown in FIG. 5, displaying the remaining number of carpool lane entrances/exits as an exiting authorized section may be performed by displaying a number in a circular frame, and displaying the remaining number of carpool lane entrances/exits as an advancing authorized section may be performed by displaying a number in a square frame on a map 31 similar to FIGS. 3 and 4. Further, without limitation, both remaining numbers can be discriminated distinctively by color.

As shown in FIG. 5, a carpool lane entrance/exit that is positioned closest to the highway interchange point/exit, that is, the above-described fourth carpool lane entrance/exit, is excluded from the remaining number as an advancing authorized section. Accordingly, the remaining number of carpool lane entrances/exits as an advancing authorized section is not displayed on a position corresponding to the fourth carpool lane entrance/exit, and further, the remaining number of carpool lane entrances/exits as an advancing authorized section is smaller than the remaining number as an exiting authorized section by "1".

Consequently, the user can simultaneously and definitely grasp the remaining number of exiting authorized sections and the remaining number of the advancing authorized sections, and a carpool lane entrance/exit from which a vehicle cannot exit before the highway interchange point/exit if he/she advances into it can be excluded from the remaining number of advancing authorized sections, so that the user can perform desired driving using the carpool lane more appropriately.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof Therefore, it is intended that this invention not be limited to the particular embodiments disclosed, but that the invention will include all embodiments falling within the scope of the appended claims.

What is claimed is:

1. An on-vehicle navigation system that performs route guidance for a vehicle from a current position to a destination along a recommended route to the destination, the system utilizing a programmed processor and comprising:

a vehicle position calculation section configured for detecting a vehicle position;

a recommended route searching section configured for searching said recommended route; and a remaining number notifying section configured for notifying a user of a value of a remaining number of a plurality of at least one of an exiting authorized section and an advancing authorized section between said vehicle position detected by said vehicle position calculation section and an interchange point or an exit of a plural-lane road which exists on said recommended route in performing route guidance of said vehicle, wherein said recommended route searched by the recommended route searching section includes a plural-lane road having a normal lane and a special lane where advancing from said normal lane in a predetermined advancing authorized section and exiting to said normal lane in a predetermined exiting authorized section are authorized.

2. The on-vehicle navigation system according to claim 1, wherein said special lane is a carpool lane.

3. The on-vehicle navigation system according to claim 1, wherein
said remaining number notifying section is configured so as to perform notification of said value of the remaining number by at least one of a display and voice output.

4. The on-vehicle navigation system according to claim 1, wherein
said remaining number notifying section is configured so as to perform notification of said value of the remaining number in the case where said vehicle position detected by said vehicle position calculation section exists on said plural-lane road.

5. The on-vehicle navigation system according to claim 1, comprising:
an exiting authorized section guidance section configured for guiding the user to the exiting authorized section in the case where a distance between said vehicle position detected by said vehicle position calculation section and said exiting authorized section that exists in the travel direction of the vehicle becomes a predetermined distance or less, in performing route guidance in the case where said recommended route searched by said recommended route searching section includes a special lane, wherein
said remaining number notifying section is configured so as to perform notification of said value of the remaining number regarding said exiting authorized section along with the guidance of said exiting authorized section by said exiting authorized section guidance section.

6. The on-vehicle navigation system according to claim 5, wherein
said exiting authorized section guidance section is configured so as to preferentially provide guidance to said exiting authorized section that exists near the interchange point or the exit of said plural-lane road.

7. The on-vehicle navigation system according to claim 5, wherein
said exiting authorized section guidance section is configured so as to perform guidance of said exiting authorized section by at least one of a display and voice output.

8. The on-vehicle navigation system according to claim 5, comprising:
a traffic information acquiring section configured for acquiring the traffic information near the interchange point or the exit of said plural-lane road, wherein
said exiting authorized section guidance section is configured so as to shift said exiting authorized section for starting guidance to an exiting authorized section that is closer to the drive start position of said vehicle on said plural-lane road, in response to an increase in traffic congestion near said interchange point or said exit as indicated by said traffic information acquired by said traffic information acquiring section.

9. The on-vehicle navigation system according to claim 5, comprising:
a lane quantity information acquiring section configured for acquiring lane quantity information indicating the number of said normal lanes, wherein
said exiting authorized section guidance section is configured so as to shift said exiting authorized section for starting guidance to an exiting authorized section that is closer to the drive start position of said vehicle on said plural-lane road, in response to an increase in said number of lanes indicated by said lane quantity information acquired by said lane quantity information acquiring section.

10. The on-vehicle navigation system according to claim 5, comprising:
a width information acquiring section configured for acquiring width information indicating the width of said normal lane, wherein
said exiting authorized section guidance section is configured so as to shift said exiting authorized section for starting guidance to an exiting authorized section that is closer to the drive start position of said vehicle on said plural-lane road, in response to an increase of said width as indicated by said width information acquired by said width information acquiring section.

11. The on-vehicle navigation system according to claim 10, comprising:
an advancing authorized section guidance section configured for guiding the user to an advancing authorized section in the case where a distance between said vehicle position detected by said vehicle position calculation section and said advancing authorized section that exists in the travel direction of said vehicle becomes a predetermined distance or less in performing route guidance for said vehicle in the case where said recommended route searched by said recommended route searching section includes said special lane, wherein
said remaining number notifying section is configured so as to perform notification of said value of the remaining number regarding said advancing authorized section in response to the guidance for said advancing authorized section by said advancing authorized section guidance section.

12. The on-vehicle navigation system according to claim 11, wherein
said advancing authorized section guidance section is configured so as to perform guidance of said advancing authorized section by at least one of a display and voice output.

13. The on-vehicle navigation system according to claim 12, comprising:
an exiting authorized section guidance section configured for guiding the user to an exiting authorized section in the case where a distance between said vehicle position detected by said vehicle position calculation section and said exiting authorized section that exists in the travel direction of said vehicle becomes a predetermined distance or less in performing route guidance for said vehicle in the case where said recommended route searched by said recommended route searching section includes said special lane, wherein
said vehicle position calculation section is configured for detecting the vehicle position together with the type of lane on which the vehicle position exists in said plural-lane road,
in the case where said vehicle position detected by said vehicle position calculation section exists in said special lane on said plural-lane road, said exiting authorized section guidance section is configured to perform guidance of said exiting authorized section, but said advancing authorized section guidance section is configured to avoid performing guidance of said advancing authorized section, and
in the case where said vehicle position detected by said vehicle position calculation section exists in said normal lane on said plural-lane road, said advancing authorized section guidance section is configured to perform guidance of said advancing authorized section, but said exiting authorized section guidance section is configured to avoid performing guidance of said exiting authorized section.

14. The on-vehicle navigation system according to claim 12, wherein
said advancing authorized section guidance section is configured to avoid performing guidance of the advancing authorized section immediately preceding the interchange point or the exit of said plural-lane road.

15. The on-vehicle navigation system according to claim 1, wherein said vehicle position calculation section is configured for detecting the vehicle position together with the type of lane on which the vehicle position exists in said plural-lane road, and said remaining number notifying section is configured so as to perform notification of the value of the remaining number of said exiting authorized sections, but not to perform notification of the value of the remaining number of said advancing authorized sections, in the case where said vehicle position detected by said vehicle position calculation section exists in said special lane on said plural-lane road.

16. The on-vehicle navigation system according to claim 1, wherein said vehicle position calculation section is configured for detecting the vehicle position together with the type of lane on which the vehicle position exists in said plural-lane road, and said remaining number notifying section is configured so as to perform notification of the value of the remaining number of said advancing authorized sections, but to avoid performing notification of the value of the remaining number of said exiting authorized sections, in the case where said vehicle position detected by said vehicle position calculation section exists in said normal lane on said plural-lane road.

17. The on-vehicle navigation system according to claim 16, wherein said remaining number notifying section is configured so as to exclude the advancing authorized section immediately preceding the interchange point or the exit of said plural-lane road.

18. The on-vehicle navigation system according to claim 1, comprising:

a traffic information acquiring section configured for acquiring the traffic information near the interchange point or the exit of said plural-lane road, wherein said remaining number notifying section is configured so as to shift a position for starting said notification of said value of the remaining number regarding said exiting authorized section toward the drive start position of said vehicle on said plural-lane road in response to an increase in traffic congestion near said interchange point or said exit as indicated by said traffic information acquired by said traffic information acquiring section.

19. The on-vehicle navigation system according to claim 1 comprising:

a lane quantity information acquiring section configured for acquiring lane quantity information indicating the number of said normal lanes, wherein said remaining number notifying section is configured so as to shift a position for starting said notification of said value of the remaining number regarding said exiting authorized section toward the drive start position of said vehicle on said plural-lane road in response to an increase in said number of lanes indicated by said lane quantity information acquired by said lane quantity information acquiring section.

20. The on-vehicle navigation system according to claim 1, comprising:

a width information acquiring section configured for acquiring width information indicating the width of said normal lane, wherein said remaining number notifying section is configured so as to shift a position for starting said notification of said value of the remaining number regarding said exiting authorized section toward the drive start position of said vehicle on said plural-lane road in response to an increase in said width as indicated by said width information acquired by said width information acquiring section.

* * * * *